US012726793B2

(12) United States Patent
Zhu et al.

(10) Patent No.: US 12,726,793 B2
(45) Date of Patent: Sep. 1, 2026

(54) TECHNIQUES FOR MANAGING MULTICAST AND BROADCAST SERVICES

(71) Applicant: ZTE Corporation, Shenzhen (CN)

(72) Inventors: Hao Zhu, Shenzhen (CN); Tao Qi, Shenzhen (CN); Lin Chen, Shenzhen (CN); Liping Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 225 days.

(21) Appl. No.: 18/475,624

(22) Filed: Sep. 27, 2023

(65) Prior Publication Data

US 2024/0022879 A1 Jan. 18, 2024

Related U.S. Application Data

(63) Continuation of application No. PCT/CN2021/084834, filed on Apr. 1, 2021.

(51) Int. Cl.

*H04W 4/06* (2009.01)
*H04W 76/20* (2018.01)
*H04W 80/02* (2009.01)

(52) U.S. Cl.

CPC ............ *H04W 4/06* (2013.01); *H04W 76/20* (2018.02); *H04W 80/02* (2013.01)

(58) Field of Classification Search

CPC ........ H04W 4/06; H04W 76/20; H04W 80/02
See application file for complete search history.

(56) References Cited

U.S. PATENT DOCUMENTS 9,166,808 B2 * 10/2015 Gou ...................... H04W 72/30
2014/0341188 A1 11/2014 Chang et al.
2023/0389049 A1 * 11/2023 Kim ....................... H04W 4/06

FOREIGN PATENT DOCUMENTS

| | | | |
|---|---|---|---|
| CN | 1921639 | | 2/2007 |
| CN | 101106474 | | 1/2008 |
| CN | 101170466 | | 4/2008 |
| CN | 111901765 | | 11/2020 |
| EP | 2690907 | | 1/2014 |
| EP | 2690907 | A1 | 1/2014 |
| EP | 4145867 | | 3/2023 |

(Continued)

OTHER PUBLICATIONS

International Search Report and Written Opinion for PCT/CN2021/084834, filed Apr. 1, 2021, Report dated Jan. 5, 2022, 9 pages.

(Continued)

*Primary Examiner* — Peter Chen
*Assistant Examiner* — Jia Hao Deng
(74) *Attorney, Agent, or Firm* — Perkins Coie LLP

(57) ABSTRACT

Techniques are described to perform a wireless communication method, comprising receiving, by a communication node, a first information that indicates to a communication node to operate in a point-to-multipoint (PTM) mode to receive multicast and broadcast service (MBS) data; receiving, by the communication node, a second information that indicates to the communication node to not operate in a point-to-point (PTP) mode to receive MBS data; and receiving MBS data by operating the communication node in the PTM mode and not in the PTP mode in response to the first information and the second information.

11 Claims, 11 Drawing Sheets

(56) References Cited

FOREIGN PATENT DOCUMENTS

KR 10-2014-0003604 A 1/2014

OTHER PUBLICATIONS

Xiaomi "Control Plane for Idle mode UE" 3GPP TSG RAN WG2 #112R2-2009597, e-Meeting, Nov. 2-13, 2020, 4 pages.
Extended European Search Report for co-pending EP Appl. No. 21 933 930.6, Report dated Mar. 22, 2024, 9 pages.
CATT "Open Issues on Dynamic PTM and PTP Switch" 3GPP TSG-RAN WG2 Meeting #113-e Online, Jan. 25-Feb. 5, 2021, R2-2100084, 7 pages.
First Examination Report for co-pending IN Appl. No. 202317065211, Report dated Feb. 5, 2025, 7 pages.
MOIP, Office Action for Korean Application No. 10-2023-7033463, mailed on Nov. 19, 2025, 12 pages with unofficial English translation.
Ericsson, "Email discussion report for [Post113-e][054][MBS17] PTP/PTM dynamic switch and MRB type change," 3GPP TSG-RAN WG2 #113bis-e, Electronic meeting, R2-210xxxx, Apr. 12-20, 2021, 26 pages.
Hearing Notice for co-pending Indian Patent Application No. 202317065211, dated Apr. 29, 2026, 2 pages.

* cited by examiner

TECHNIQUES FOR MANAGING MULTICAST AND BROADCAST SERVICES

CROSS-REFERENCE TO RELATED APPLICATION

This application is a continuation and claims priority to International Application No. PCT/2021/084834, filed on Apr. 1, 2021, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for managing multicast and broadcast services so that in some embodiments, packet loss can be minimized or avoided when switching between modes.

A first a wireless communication method, comprises receiving, by a communication node, a first information that indicates to a communication node to operate in a point-to-multipoint (PTM) mode to receive multicast and broadcast service (MBS) data; receiving, by the communication node, a second information that indicates to the communication node to not operate in a point-to-point (PTP) mode to receive MBS data; and receiving MBS data by operating the communication node in the PTM mode and not in the PTP mode in response to the first information and the second information.

In some embodiments, the communication node receives the first information while operating in the PTP mode. In some embodiments, the first information indicates to the communication node to operate in the PTM mode and not to operate in the PTP mode to receive MBS data. In some embodiments, the second information indicates an absence of data transmission to the communication node via the PTP mode. In some embodiments, the second information is indicated by a flag included in a packet data convergence protocol (PDCP) protocol data unit (PDU) or a radio link control (RLC) PDU. In some embodiments, the communication node transmits a packet data convergence protocol (PDCP) status report to a network node in response to receiving the first information, and the PDCP status report indicates whether one or more packets are successfully received by the communication node. In some embodiments, the second information is included in a radio resource control (RRC) signal, a packet data convergence protocol (PDCP) protocol data unit (PDU), a radio link control (RLC) PDU, or a medium access control-control element (MAC CE).

A second a wireless communication method, comprises receiving, by a communication node, a first information that indicates to a communication node to operate in a point-to-point (PTP) mode to receive multicast and broadcast service (MBS) data and not to operate in a point-to-multipoint (PTM) mode to receive MBS data; determining, by the communication node, to operate in the PTP mode and not to operate in the PTM mode to receive MBS data based on a rule associated with the first information; and receiving a set of MBS data by the communication node operating in the PTP mode and not operating in the PTM mode.

In some embodiments, the communication node receives the first information while operating in the PTM mode. In some embodiments, the rule specifies that the communication node determines to operate in the PTP mode and determines not to operate in the PTM mode in response to receiving the first information. In some embodiments, the rule specifies that the communication node determines to operate in the PTP mode and determines not to operate in the PTM mode after a length of time after receiving the first information.

A third a wireless communication method, comprises transmitting, by user plane (UP) of a centralized unit (CU) of a network node to a distributed unit (DU) of the network node, an information that indicates that there is an absence of data in a radio bearer for a multicast and broadcast service (MBS) for a point-to-point (PTP) transmission; and receiving, by the DU of the network node, the information, where the information includes a flag that indicates whether a frame that includes the information also includes a last packet data convergence protocol (PDCP) protocol data unit (PDU) for the PTP transmission.

In some embodiments, the information includes a number of the one or more communication nodes and an identity of each communication node in response to the flag indicating that the frame includes the last PDCP PDU for the PTP transmission for the one or more communication nodes. In some embodiments, the frame is transmitted in a F1-U tunnel associated with the one or more communication nodes using a single radio bearer associated with the MBS. In some embodiments, the frame is transmitted in a F1-U tunnel associated with a specific communication node operating in the PTP mode. In some embodiments, the frame is transmitted in a F1-U tunnel delivering packets related to a single radio bearer associated with the MBS.

A fourth a wireless communication method, comprises receiving, by user plane (UP) of a centralized unit (CU) of a network node from a distributed unit (DU) of the network node, an information that indicates an expected absence of data via a point-to-point (PTP) communication technique between the DU of the network node and one or more communication nodes, where the information is received in a frame by the UP of the CU of the network node.

In some embodiments, the frame further includes any one or more of a flag that indicates whether the information is for which of the one or more communication nodes, a number of the one or more communication nodes, and an identity of each communication node.

A fifth a wireless communication method, comprises receiving, by a centralized unit (CU) of a network node from a distributed unit (DU) of the network node, an information that indicates an expected absence of data via a point-to-point (PTP) communication technique between the DU of the network node and one or more communication nodes, where the information includes any one or more of: a radio bearer identifier, a flag that indicates whether the information is applicable to one or more communication nodes, a number of the one or more communication nodes, an identity of each communication node, and a multicast session identifier.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
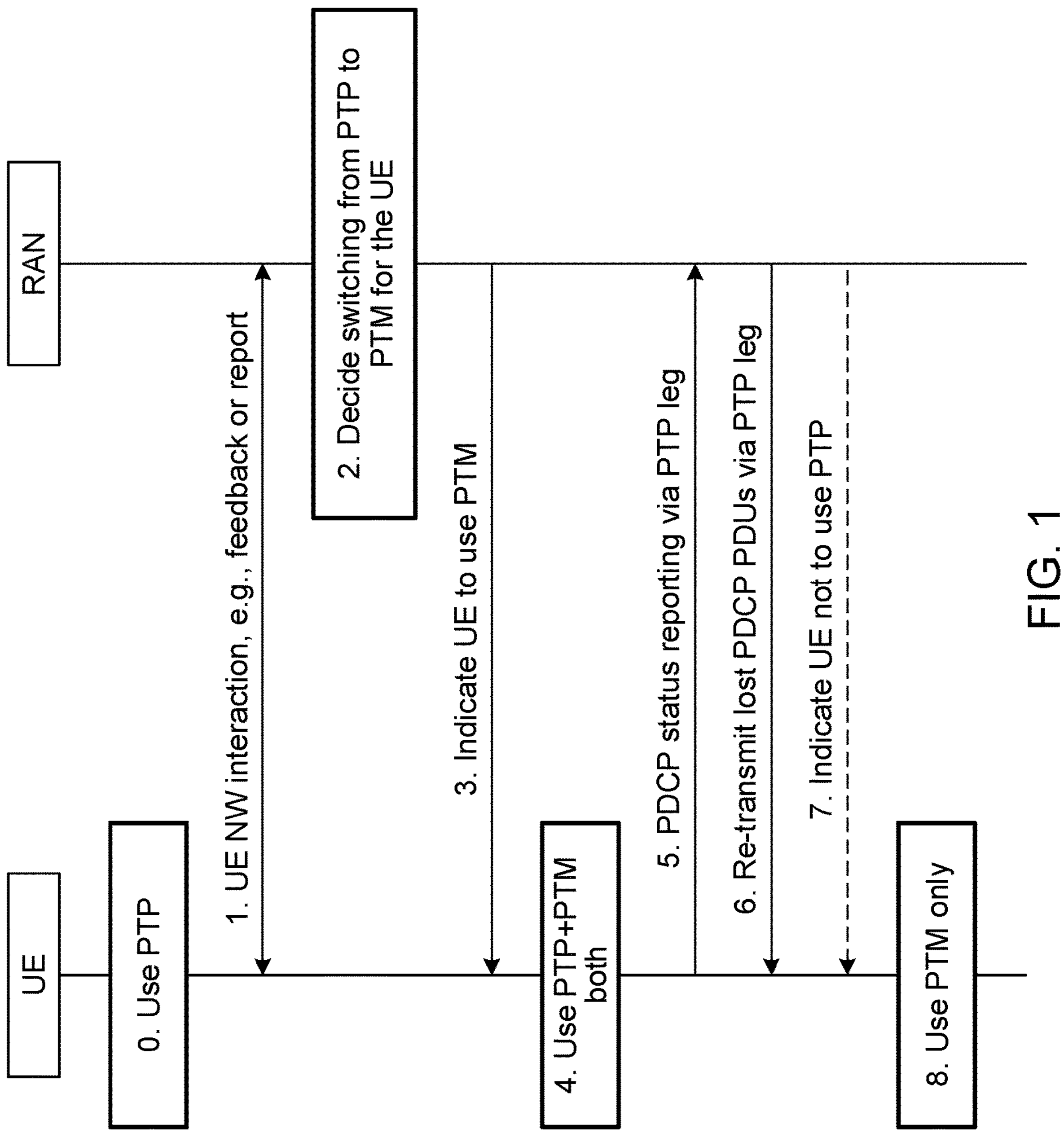
FIG. 1 shows an example technique for lossless switching from a point-to-point (PTP) mode to ai point-to-multipoint (PTM) mode.

A UE may receive a multicast broadcast session (MBS) via different modes, such as point-to-point (PTP) mode or point-to-multipoint (PTM) mode. When the mode is changed from one to another, techniques are needed to minimize the packets loss or even enable a lossless mode switching. The example methods proposed in this patent document are designed to, among other things, minimize or even avoid the packets loss during mode switching between PTP and PTM.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Example Techniques to Avoid or Reduce Packet Loss During Mode Switching.

In following methods and examples, the meaning of "not to use PTP to receive MBS data" or to not operate in PTP mode to receive MBS data can include at least one of the following descriptions.

- to release a radio link control (RLC) bearer for PTP from a radio bearer for MBS.
- to deactivate PTP, or to deactivate the reception in a RLC bearer for PTP from a radio bearer for MBS, or to reset the state variables and/or the timer(s) to initial values in the RLC entity for PTP from a radio bearer for MBS.

The meaning of "to use PTM to receive MBS data" or to operate in PTM mode to receive MBS data can include at least one of the following descriptions.

- to add a RLC bearer for PTM to radio bearer for MBS.
- to activate PTM, or to activate the reception in a RLC bearer for PTM from a radio bearer for MBS, or to resume monitoring G-RNTI (e.g., the radio network temporary identifier for the MBS group).

The meaning of "not to use PTM to receive MBS data" or to not operate in PTM mode to receive MBS data can include at least one of the following descriptions.

- to release a RLC bearer for PTM from a radio bearer for MBS.
- to deactivate PTM, e.g., to suspend monitoring G-RNTI, or to deactivate the reception in a RLC bearer for PTM from a radio bearer for MBS.

The meaning of "to use PTP to receive MBS data" or to operate in PTP mode to receive MBS data can include at least one of the following descriptions.

- to add a RLC bearer for PTP to radio bearer for MBS.
- to activate PTP, or to activate the reception in a RLC bearer for PTP from a radio bearer for MBS.

I.(a). Scenario 1: The UE Needs to Switch from PTP to PTM

Method 1-1

After the UE receives a first information from a base station, the UE uses PTM to receive MBS data, meanwhile the UE keeps receiving MBS data from PTP until it receives a second information from the base station. After the UE receives a second information, the UE no longer uses PTP to receive MBS data.

Example 1-1-1

The UE receives a first information from the gNB, where the first information indicates to the UE to use PTM to receive MBS data and not to use PTP to receive MBS data.

After receiving the first information, the UE use PTM to receive MBS data, meanwhile the UE keeps using PTP to receive MBS data until it receives a second information. Upon receiving the first information, the UE sends a packet data convergence protocol (PDCP) status report to the base station via PTP. The UE include information in the PDCP status report to indicate to the base station which data packet(s) have been successfully received and which data packet(s) have been lost during transmission. If the UE does not receive a second information, the UE keeps using PTP to receive MBS data.

After receiving the second information, the UE no longer uses PTP to receive MBS data. In some embodiments, the UE receives the second information after the UE transmits the PDCP status information to the base station. The second information may include at least one of the following descriptions:

For example, the second information may be an end marker or a flag in PDCP PDU or RLC PDU, where the end marker or flag indicates that there is no more data to be transmitted through PTP. The PDCP PDU may be a PDCP Data PDU or a PDCP Control PDU. The RLC PDU may be a RLC Data PDU or RLC Control PDU.

For another example, the second information may be included in a MAC CE indicating that PTP can be released or deactivated from now.

Example 1-2-1

The UE, which is receiving MBS data via PTP, receives a first information from the gNB, where the first information indicates to the UE to use PTM to receive MBS data.

Upon receiving the first information, the UE may perform at least one of the following actions: to use PTM to receive MBS data, or to send a PDCP status report to the base station via PTP.

Then, the UE receives a second information which indicates the UE not to use PTP to receive MBS data. The second information may be included in a RRC signaling, a PDCP PDU, a RLC PDU, a MAC CE. In some embodiments, the second information may be received by the UE after the UE receives the first information that indicates to the UE to use PTM to receive MBS data.

Method 1-2

After receiving a first information indicating the UE to use PTM to receive MBS data and not to use PTP to receive MBS data, the UE starts to use PTM to receive MBS data, meanwhile the UE keeps receiving MBS data from PTP for a time period. In some embodiments, the UE keeps receiving the MBS data from PTP for a pre-determined time period.

Upon receiving the first information, the UE sends a PDCP status report to the base station via PTP.

After sending a PDCP status report to gNB, the UE itself decides the timing (e.g., a length of time) when not to use PTP to receive MBS data. For example, the timing may be up-to-implementation. For another example, the timing may be based upon the UE successfully receiving the lost PDCP SNs which was included in the PDCP status report triggered by the first information.

FIG. 1 shows an example technique for lossless switching from a point-to-point (PTP) mode to ai point-to-multipoint (PTM) mode. RAN node can decide the delivery mode for the set of UEs associated with the MBS session based on the UE context, the MBS session context, and the network resource status. If the gNB decides that a UE needs to switch from PTP to PTM, and lossless mode switching needs to be supported, UE and gNB can perform the example operations as shown in FIG. 1. Operations 0 to 8 shown in FIG. 1 are described below and in this patent document.

0. UE is using PTP for reception of MBS.
1. The UE and RAN may perform network (NW) interaction where the UE may feedback the MBS reception status or channel condition.
2. RAN decides to switch from PTP to PTM for the UE.
3. RAN indicates UE to use PTM for reception of MBS.

4-5. After Operation 3, UE use PTM and PTP both for receiving MBS, meanwhile UE sends a PDCP status report to RAN.

6. According to the PDCP status report, RAN knows which packets are lost by the UE and re-transmit these packets to the UE via PTP leg.
7. After successfully transmitting the lost packets via PTP, RAN indicates UE not to use PTP.
8. UE use PTM only for reception of MBS, UE does not use PTP from now. Operation 8 can be triggered by operation 7 if lossless mode switching needs to be ensured by protocol mean. Operation 7 can also be omitted if only aiming at minimizing data loss rather than lossless, then operation 8 is triggered by UE implementation after that operation 4 has been performed for a time period (e.g., for a pre-determined time period).

I.(b). Scenario 2: The UE Needs to Switch from PTM to PTP

Method 2

After receiving a third information, the UE uses PTP to receive MBS data, meanwhile the UE sends a PDCP status report to the base station.

Example 2-1

The third information indicates to the UE to use PTP to receive MBS data and not to use PTM to receive MBS data.

After receiving the third information, the UE uses PTP to receive MBS data, meanwhile the UE sends a PDCP status report to the base station.

The timing for the UE not to use PTM to receive MBS data may include at least one of the following:

Upon receiving the third information (e.g., the UE stops receiving MBS data in PTM in response to the UE receiving the third information).

After receiving the third information for a time period (e.g., for a pre-determined time period).

Example 2-2

The third information indicates to the UE to use PTP to receive MBS data.

The timing for the UE not to use PTM to receive MBS data may include at least one of the following:

Upon receiving a fourth information indicating the UE not to use PTM to receive MBS data (e.g., the UE stops receiving MBS data in PTM in response to the UE receiving the fourth information). In some embodiments, the fourth information may be received by the UE after the UE receives the third information that indicates to the UE to use PTP to receive MBS data.

Figure 2:
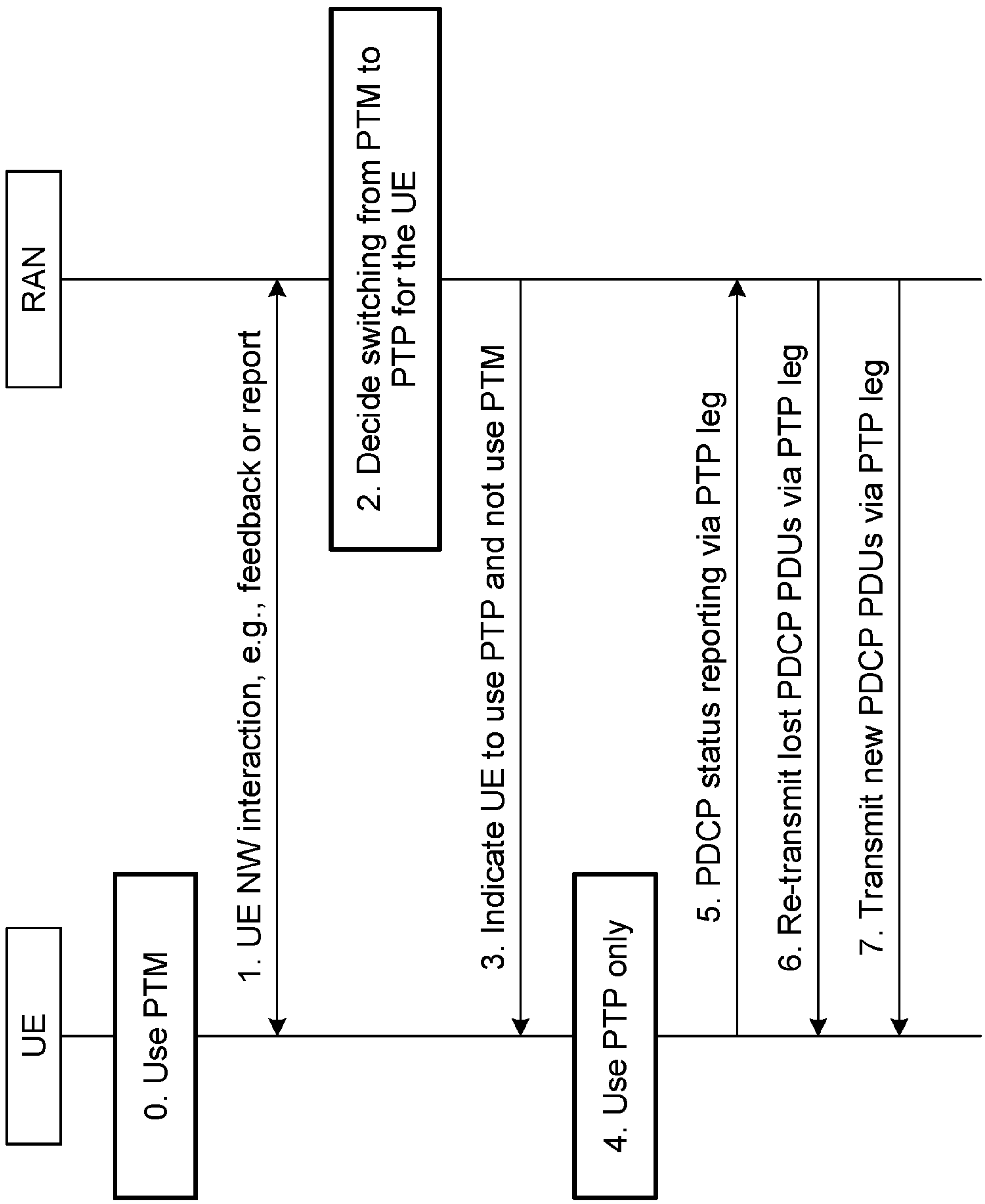
FIG. 2 shows an example technique for performing lossless switching from a PTM mode to a PTP mode.

In some embodiments, a wireless communication method for Example 2-2 may include receiving, by a communication node, a first information that indicates to a communication node to operate in a point-to-point (PTP) mode to receive multicast and broadcast service (MBS) data; receiving, by the communication node, a second information that indicate to the communication node not to operate in a point-to-multipoint (PTM) mode to receive MBS data; determining, by the communication node, to not operate in the PTM mode to receive MBS data in response to receiving the second information; and receiving a set of MBS data by the communication node operating in the PTP mode and not operating in the PTM mode. In some embodiments, the communication node receives the first information while operating in the PTM mode FIG. 2 shows an example technique for performing lossless switching from a PTM mode to a PTP mode. If the gNB decides that a UE needs to switch from PTM to PTP, and lossless mode switching needs to be supported, the UE and gNB can perform the example operations as shown in FIG. 2. Operations 0 to 7 shown in FIG. 2 are described below and in this patent document.

0. UE is using PTM for reception of MBS.
1. The UE and RAN may perform network (NW) interaction where the UE may feedback the MBS reception status or channel condition.
2. RAN decides to switch from PTM to PTP for the UE.
3. RAN indicates UE to use PTM and not to use PTP for reception of MBS.
4-5. After operation 3, UE use PTP only for receiving MBS, meanwhile UE sends a PDCP status report to RAN.
6. According to the PDCP status report, RAN knows which packets are lost by the UE and re-transmit these packets to the UE via PTP leg.
7. After successfully transmitting the lost packets via PTP, RAN transmit new packets to the UE via PTP.

I.(c). Scenario 3: The UE Needs to Switch from PTP+PTM to PTP, or from PTP+PTM to PTM The UE receives a ninth information from the base station, where the ninth information triggers UE to perform PDCP status reporting. The ninth information may be a polling indication included a PDCP PDU. In another embodiment, the ninth information may be included in a RRC message.

The UE receives an tenth information which indicates the UE not to use PTP or PTM to receive MBS data. The tenth information may be included in a RRC message or a MAC CE or a PDCP PDU or a RLC PDU.

Upon receiving the tenth information, the UE do not use PTP or PTM to receive MBS data instantly or after a time period (e.g., after a pre-determined time period).

The base station may send the tenth information after sending the one or more packets that are lost as indicated by the PDCP status report triggered by the ninth information.

Figure 3:
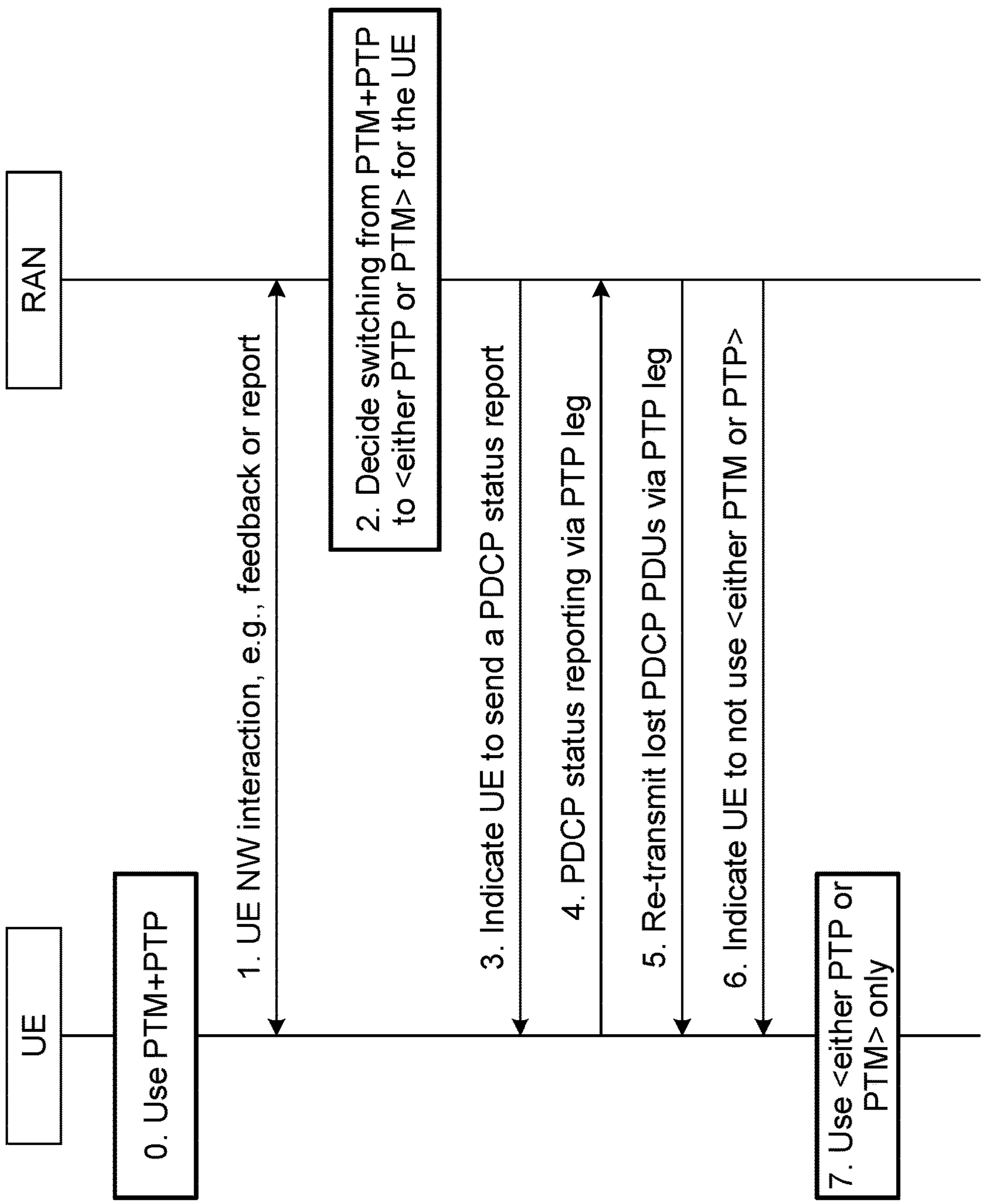
FIG. 3 shows an example technique for performing lossless switching from a combination of a PTM mode and a PTP mode to either the PTP mode or the PTM mode.

FIG. 3 shows an example technique for performing lossless switching from a combination of a PTM mode and a PTP mode to either the PTP mode or the PTM mode. If the gNB decides that a UE needs to switch from PTM+PTP (e.g., both PTM and PTP) to either PTP or PTM, and lossless mode switching needs to be supported, the UE and gNB can perform the example operations as shown in FIG. 3. Operations 0 to 7 shown in FIG. 3 are described below and in this patent document.

0. UE is using PTM+PTP for reception of MBS.
1. The UE and RAN may perform network (NW) interaction where the UE may feedback the MBS reception status or channel condition.
2. RAN decides to switch from PTM+PTP to <either PTP or PTM> for the UE.
3. RAN indicates UE to send a PDCP status report.
4. UE sends a PDCP status report to RAN via PTP leg.
5. According to the PDCP status report, RAN knows which packets are lost by the UE and re-transmit these packets to the UE via PTP leg.
6. After successfully transmitting the lost packets via PTP, RAN indicate UE not to use <either PTM or PTP> to receive MBS.
7. UE only use <either PTP or PTM> for reception of MBS.

In some embodiments, a wireless communication method for Scenario 3 may include transmitting, by a communication node, a packet data convergence protocol (PDCP) status report that indicates whether one or more packets are successfully received by the communication node; receiving, by the communication node and in response to the PDCP status report, an information that instructs the communication node to not operate in a point-to-multipoint (PTM) mode and in a point-to-point (PTP) mode to receive multicast and broadcast service (MBS) data; and receiving, by the communication node, MBS data while not operating in the PTP mode and the PTM mode based on a rule. In some embodiments, the rule specifies that the communication node receives MBS data while not operating in PTP mode and in PTM mode in response to the receiving the information. In some embodiments, the rule specifies that the communication node receives MBS data while not operating in PTP mode and in PTM mode after a length of time after the receiving the information.

Figure 4:
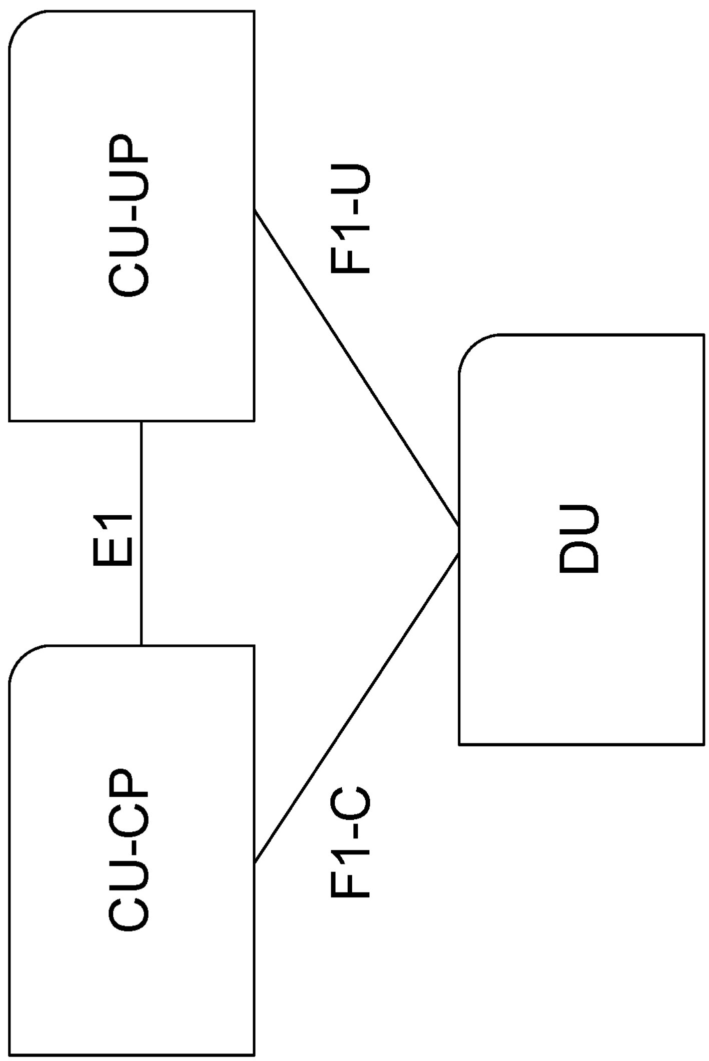
FIG. 4 shows an example block diagram of a centralized unit (CU)-distributed unit (DU) split architecture in a base station.

II. Techniques Regarding when a Base Station in a CU-DU Split Architecture is Expected to Send an Indication of a Timing not to Use a Previous Mode FIG. 4 shows an example block diagram of a CU-DU split architecture in a base station. In 5G technology, the CU may perform operations related to the PDCP layer and the DU may perform operations related to the RLC and MAC layers. The CU and DU need to inform each other about when they have finished processing data packets (which may be retransmission data packets) so that the base station can send an information (e.g., the second information in method 1-1 or the fourth information in example 2-2) to the UE to inform the UE not to use a previous mode (e.g., PTP or PTM)

If the command sender is CU-UP, the command sender can know the timing of PTP release through the following way: CU-UP can notify the DU about that the PDCP entity has successfully delivered all PDCP PDUs needing to be transmitted via PTP, and the DU can feed back the downlink data delivery status to CU-UP. CU-UP then knows the time to send the command to UE not to operate in PTP mode.

If the command sender is CU-CP, the command sender can know the timing of PTP release through the following way: CU-UP can notify the DU about that the PDCP entity has successfully delivered all PDCP PDUs needing to be transmitted via PTP, and the DU can feed back downlink data delivery status to the CU-UP, and then the CU-UP informs the CU-CP that it is time to send the command to UE not to operate in PTP mode.

If the command sender is a DU, the command sender can know the timing of PTP release through the following way: CU-UP can notify the DU about that the PDCP entity has successfully delivered all PDCP PDUs needing to be transmitted via PTP, then DU itself can decide the suitable time to send the command to UE not to operate in PTP mode based on the RLC ACK or packet delivery status.

Method 3

The CU-UP of a base station sends a fifth information to DU of the same base station for indicating that there is no more data in radio bearer of a MBS for PTP transmission. In some embodiments, after the CU-UP sends the fifth information to the DU, the base station may send information to the UE(s) to indicate to the UE(s) to not use or to not operate in the PTP mode as explained in Section I of this patent document.

Example 3-1

The fifth information includes a first flag to indicate that whether the frame carrying the fifth information carries the last PDCP PDU via PTP for one or more UEs. The frame carrying the fifth information may be a F1-U packet sent from CU-UP to the DU, where the frame header can be in F1-U protocol, and the frame load can be a PDCP PDU. In some embodiments, the PDCP PDU (e.g., the load) can be processed by the RLC/MAC entity in the DU and sent to the UE.

The fifth information further includes the number of UEs and the identity of each UE if the first flag indicates this frame includes the last PDCP PDU via PTP for one or more UEs. Thus, the F1-U tunnel in Example 3-1 can be a group-common tunnel.

The fifth information is included in a first frame.

The first frame is used for transfer of a Downlink NR PDCP PDU for MBS from CU-UP to DU. The first frame is transmitted in a procedure which is associated with a single radio bearer for a MBS and is associated with a group of UEs joining or that have joined the MBS.

Example 3-2

The fifth information includes a first flag to indicate that whether the frame carrying the fifth information carries the last PDCP PDU via PTP for a UE.

The fifth information is included in a second frame.

The second frame is used for transfer of a Downlink NR PDCP PDU for MBS from CU-UP to DU. The second frame is transmitted in a procedure which is associated with a single radio bearer for a MBS and is associated with a specific UE receiving the radio bearer via PTP mode. Thus, the F1-U tunnel in Example 3-2 can be a UE-specific tunnel.

Method 4

CU-UP sets DL report NR PDCP PDU SN as the last PDCP SN associated with the last packet which is to be transmitted via PTP for one or more UE(s) in a third frame.

The third frame is used for transfer of a Downlink NR PDCP PDU for MBS from CU-UP of a base station to DU of the same base station. Since the DU, upon receiving the third frame, determines the SN of the last PDCP PDU, the DU can check whether the one or more PDCP PDUs received by the DU have the same SN as the last PDCP PDU. Once the DU determines that a PDCP PDU has the same SN as the last PDCP PDU, the base station can send information to the UE(s) to not use or not operate in the PTP mode.

The third frame is transmitted in a procedure which is associated with a single radio bearer for a MBS. In one embodiment, the procedure is associated with a specific UE receiving the radio bearer via PTP mode.

In another embodiment, the procedure is associated with a group of UEs joining or that have joined the MBS. The third frame further includes a second flag indicating whether this frame carries a PDCP PDU for PTP for one or more UEs, the number of UEs receiving this PDCP PDU via PTP, and the identity of each UE.

In some embodiments, a wireless communication method for Method 4 includes transmitting, by user plane (UP) of a centralized unit (CU) of a network node to a distributed unit (DU) of the network node, a serial number of a last packet data convergence protocol (PDCP) protocol data unit (PDU) to be transmitted in a radio frame via a point-to-point (PTP) transmission; receiving, by the DU of the network node, the serial number of the last PDCP PDU for the PTP transmission; and transmitting, by the network node and in response to receiving by the DU the serial number, information to one or more communication nodes, where the information instructs the one or more communication nodes whether to operate in a PTP mode. In some embodiments, the frame is transmitted in a FI-1 tunnel associated with the one or more communication nodes using a single radio bearer associated with the MBS. In some embodiments, the frame is transmitted in a FI-U tunnel associated with a specific communication node operating in the PTP mode. In some embodiments, the frame further includes any one or more of: a flag that indicates whether the radio frame includes the last PDCP PDU for the PTP transmission, a number of the one or more communication nodes, and an identity of each communication node.

Method 5

DU sends a sixth information to CU-UP for indicating that no more UL or DL data is expected to be transmitted between DU and the UE(s) via PTP. In some embodiments, after the DU sends the sixth information to the CU-UP or after the CU-UP receives the sixth information, the gNB transmits another information that instructs the one or more communication nodes whether to operate in a PTP mode, as explained in Section I of this patent document.

The sixth information can be included in a fourth frame. The fourth frame is used to provide feedback from DU to CU-UP to allow CU-UP to control the downlink user data flow for the respective radio bearer of MBS. In some embodiments, the CU-UP can control the data transmission speed based on the information from the fourth frame. The fourth frame is transmitted in a procedure which is associated with a single radio bearer for a MBS.

In one embodiment, the procedure is associated with a specific UE receiving the radio bearer via PTP mode.

In another embodiment, the procedure is associated with a group of UEs joining or that have joined the MBS. The fourth frame further includes at least one of the following: a third flag indicating whether this feedback is for one or more specific UEs, the number of the specific UEs, or the identity of each UE.

Method 6

DU sends a seventh information to CU-CP for indicating that no more UL or DL data is expected to be transmitted between DU and the UE(s) via PTP. In some embodiments, if the CU-CP determines that the seventh information is a RRC message, the CU-CP can send the second information, as explained in Section I of this patent document, after receiving the seventh information.

The seventh information can be included in a F1AP message. The F1AP message is transmitted in a F1AP procedure.

In one embodiment, the procedure is associated with a multicast session. The seventh information further includes at least one of the following: the radio bearer ID, a fourth flag indicating whether this information is for one or more specific UEs, the number of the specific UEs, or the identity of each UE.

In another embodiment, the procedure is associated with a specific UE. The seventh information further includes the multicast session ID, the radio bearer ID.

Method 7

CU-UP sends an eighth information to CU-CP for indicating that no more UL or DL data is expected to be transmitted between DU and the UE(s) via PTP. In some embodiments, if the CU-CP determines that the eighth information is a RRC message, the CU-CP can send the second information, as explained in Section I of this patent document, after receiving the eighth information.

The eighth information can be included in a E1AP message. The E1AP message is transmitted in a E1AP procedure.

In one embodiment, the procedure is associated with a multicast session. The eighth information further includes at least one of the following: the radio bearer ID, a fifth flag indicating whether this information is for one or more specific UEs, the number of the specific UEs, or the identity of each UE.

In another embodiment, the procedure is associated with a specific UE. The eighth information further includes the multicast session ID, the radio bearer ID.

III. Techniques to Enable the UEs of MBS to Move a Receiving Window Under Control of Base Station Method 8

This section describes techniques to address the issue of whether there is a need to enable the UEs of MBS to move a receiving window under the control of a base station. In some embodiments, the base station can be enabled to dynamically control UEs to lose some packets for catching up with the speed of packets transmission. The base station can send a special PDCP PDU to all UEs, which includes a specific PDCP SN or COUNT. After receiving this PDCP PDU, the UEs will move the lower bound of the receiving window to a specific PDCP SN or COUNT. The specific COUNT means a COUNT associated to the specific PDCP SN included in the special PDCP PDU, or the specific COUNT included in the specific PDCP PDU.

After receiving the special PDCP PDU, the PDCP entity of UE performs at least one of (or any one or more of) the following actions:

deliver to upper layers in ascending order of the associated COUNT value after performing header decompression, if not decompressed before:

all stored PDCP SDU(s) with associated COUNT value (s)<the specific COUNT;

all stored PDCP SDU(s) with consecutively associated COUNT value(s) starting from the specific COUNT;

update RX_DELIV to the COUNT value of the first PDCP SDU which has not been delivered to upper layers, with COUNT value >=the specific COUNT;

if RX_DELIV<RX_NEXT:

update RX_REORD to RX_NEXT;

start t-Reordering.

Method 9

The base station can send a special RLC packet to a group of UEs receiving via PTM, which includes a specific SN. After receiving this RLC packet, the UEs will move the lower bound of the receiving window to a specific SN.

After receiving the special RLC packet, the receiving side of an AM RLC entity shall perform at least one of the following actions:

Discard all segments with SN<the specific SN, that have not been reassembled and delivered to upper layer Update RX_Next to the specific SN.

update RX_Highest_Status to the SN of the first RLC SDU with SN>=RX_Next_Status_Trigger for which not all bytes have been received;

if RX_Next_Highest>RX_Highest_Status+1: or if RX_Next_Highest=RX_Highest_Status+1 and there is at least one missing byte segment of the SDU associated with SN=RX_Highest_Status before the last byte of all received segments of this SDU:

start t-Reassembly;

set RX_Next_Status_Trigger to RX_Next_Highest.

In some embodiments for the techniques described in Section III, a wireless communication method includes receiving, by a communication node, a serial number of a last packet data convergence protocol (PDCP) protocol data unit (PDU) or a first number of PDCP PDUs to be received by the communication node; and determining by the communication node, a lower bound of a receiving time period to receive one or more PDCP PDUs, where one of the one or more PDCP PDUs has the serial number of the last PDCP PDU, or where a second number of the one or more PDCP PDUs is equal to the first number of PDCP PDUs to be received by the communication node.

Figure 5:
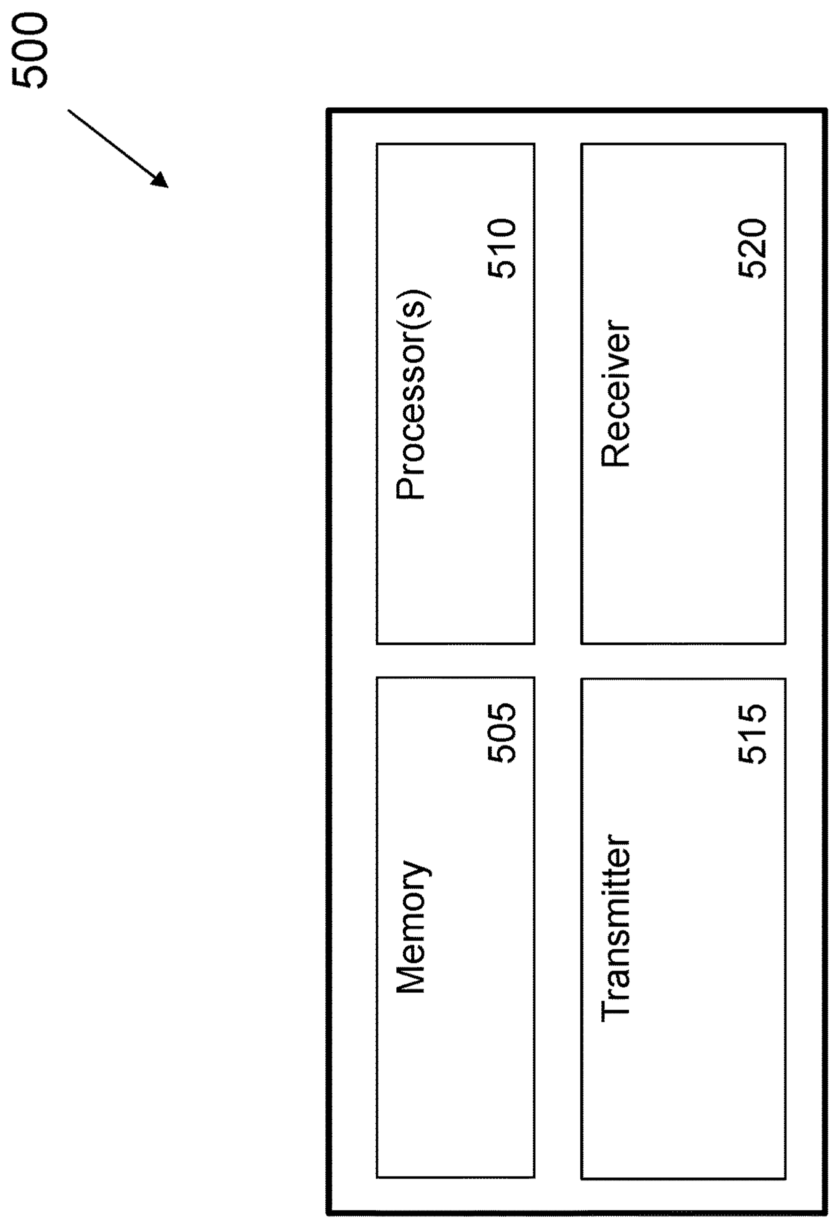
FIG. 5 shows an exemplary block diagram of a hardware platform 500 that may be a part of a network node or a user equipment.

FIG. 5 shows an exemplary block diagram of a hardware platform 500 that may be a part of a network node or a user equipment. The hardware platform 500 includes at least one processor 510 and a memory 505 having instructions stored thereupon. The instructions upon execution by the processor 510 configure the hardware platform 500 to perform the operations described for FIGS. 1 to 4 and 7 to 15 and in the various embodiments described in this patent document. The transmitter 515 transmits or sends information or data to another node. For example, a network node transmitter can send a message to a user equipment. The receiver 520 receives information or data transmitted or sent by another node. For example, a user equipment can receive a message from a network node.

Figure 6:
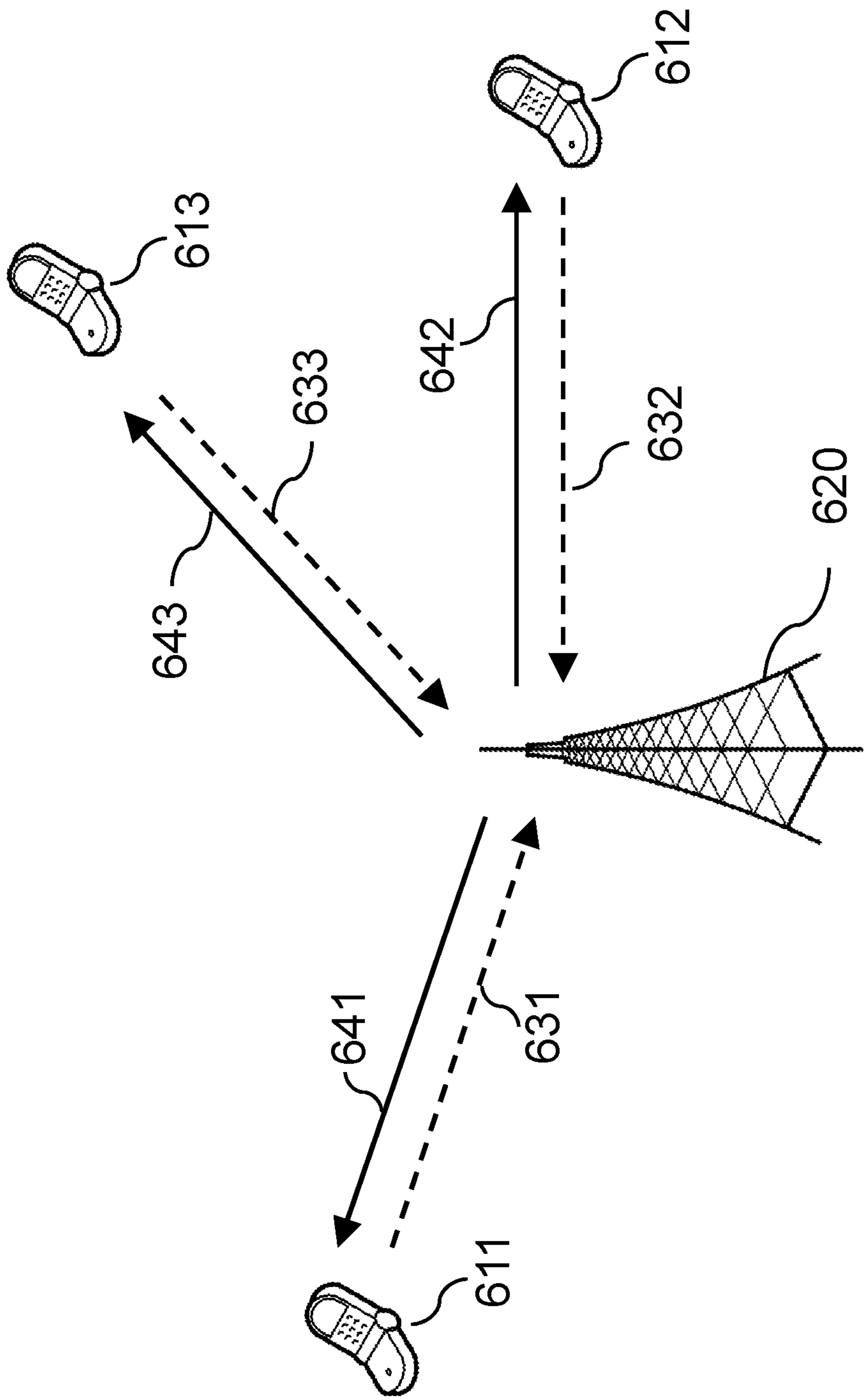
FIG. 6 shows an example of wireless communication including a base station (BS) and user equipment (UE) based on some implementations of the disclosed technology.

The implementations as discussed above will apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643) from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on.

The UE may be, for example, a smartphone, a tablet, a mobile computer, a machine to machine (M2M) device, an Internet of Things (IoT) device, and so on.

Figure 7:
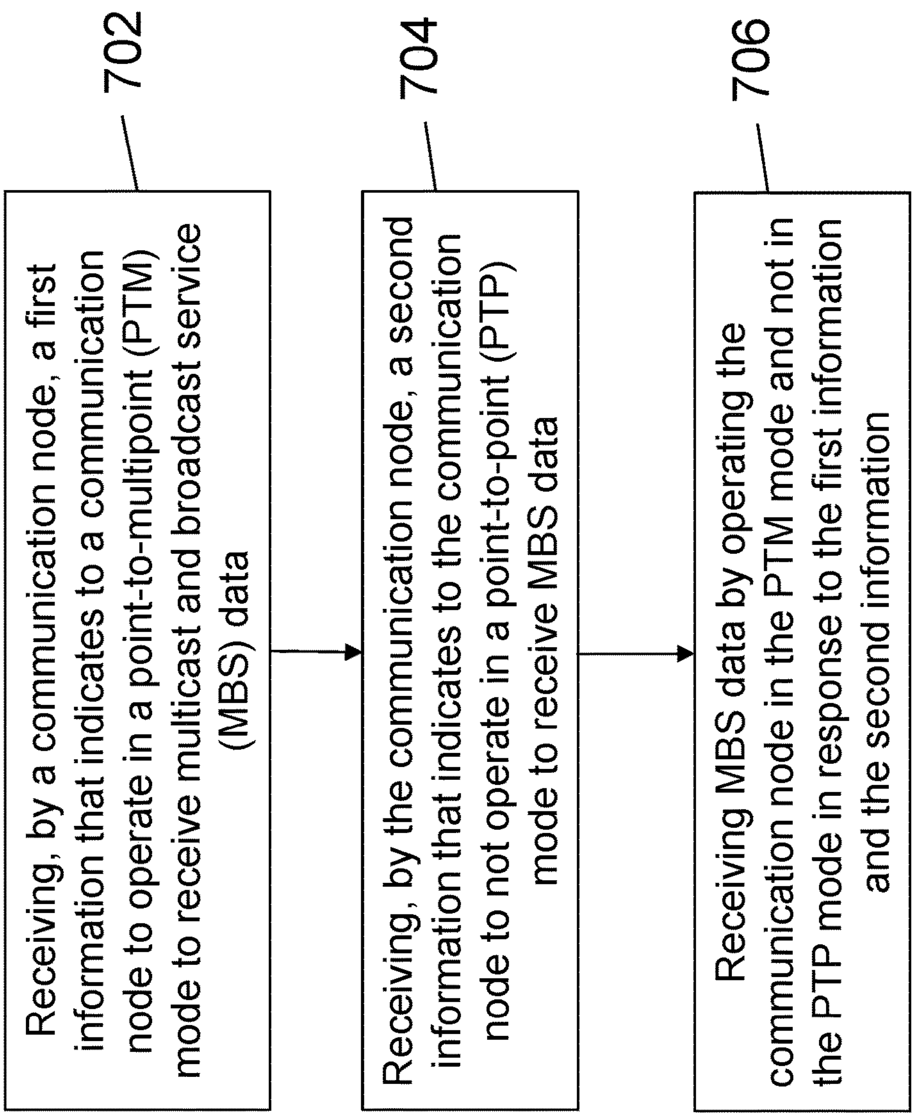
FIG. 7 shows an exemplary flowchart for operating a communication node in a PTM mode or a PTP mode.

FIG. 7 shows an exemplary flowchart for operating a communication node (e.g., a communication device or user equipment) in a PTM mode or a PTP mode. Operation 702 includes receiving, by a communication node, a first information that indicates to a communication node to operate in a point-to-multipoint (PTM) mode to receive multicast and broadcast service (MBS) data. Operation 704 includes receiving, by the communication node, a second information that indicates to the communication node to not operate in a point-to-point (PTP) mode to receive MBS data. Operation 706 includes receiving MBS data by operating the communication node in the PTM mode and not in the PTP mode in response to the first information and the second information.

In some embodiments, the communication node receives the first information while operating in the PTP mode. In some embodiments, the first information indicates to the communication node to operate in the PTM mode and not to operate in the PTP mode to receive MBS data. In some embodiments, the second information indicates an absence of data transmission to the communication node via the PTP mode. In some embodiments, the second information is indicated by a flag included in a packet data convergence protocol (PDCP) protocol data unit (PDU) or a radio link control (RLC) PDU. In some embodiments, the communication node transmits a packet data convergence protocol (PDCP) status report to a network node in response to receiving the first information, and the PDCP status report indicates whether one or more packets are successfully received by the communication node. In some embodiments, the second information is included in a radio resource control (RRC) signal, a packet data convergence protocol (PDCP) protocol data unit (PDU), a radio link control (RLC) PDU, or a medium access control-control element (MAC CE).

In some embodiments, another wireless communication method includes receiving, by a communication node, a first information that indicates to a communication node to operate in a point-to-multipoint (PTM) mode to receive multicast and broadcast service (MBS) data; determining that the communication node simultaneously operates in a point-to-point (PTP) mode and in the PTM mode in response to the first information; and receiving a first set of MBS data by the communication node operating in the PTP mode and in the PTM mode.

In some embodiment, the communication node receives the first information while operating in the PTP mode. In some embodiment, the first information indicates to the communication node to operate in the PTM mode and not to operate in the PTP mode to receive MBS data. In some embodiment, the method further includes receiving, by the communication node, a second information that indicates an absence of data transmission to the communication node via the PTP mode; determining that the communication node does not operate in the PTP mode in response to the second information; and receiving a second set of MBS data by the communication node operating in the PTM mode and not operating in the PTP mode. In some embodiment, the second information is indicated by a flag included in a packet data convergence protocol (PDCP) protocol data unit (PDU) or a radio link control (RLC) PDU. In some embodiment, the method further includes receiving, by the communication node, a second information that indicates a release or a deactivation of the PTP mode; determining that the communication node does not operate in the PTP mode in response to the second information; and receiving a second set of MBS data by the communication node operating in the PTM mode and not operating in the PTP mode.

In some embodiment, the communication node transmits a packet data convergence protocol (PDCP) status report to a network node in response to receiving the first information, and the PDCP status report indicates whether one or more packets are successfully received by the communication node. In some embodiment, the method further includes receiving, by the communication node, a second information that indicates not to operate in the PTP mode to receive MBS data; determining that the communication node does not operate in the PTP mode in response to the second information; and receiving a second set of MBS data by the communication node operating in the PTM mode and not operating in the PTP mode.

In some embodiment, the second information is included in a radio resource control (RRC) signal, a packet data convergence protocol (PDCP) protocol data unit (PDU), a radio link control (RLC) PDU, or a medium access control-control element (MAC CE). In some embodiment, the communication node determines not to operate in the PTP mode for a length of time after the communication node sends a packet data convergence protocol (PDCP) status report to a network node, and the PDCP status report indicates whether one or more packets are successfully received by the communication node.

Figure 8:
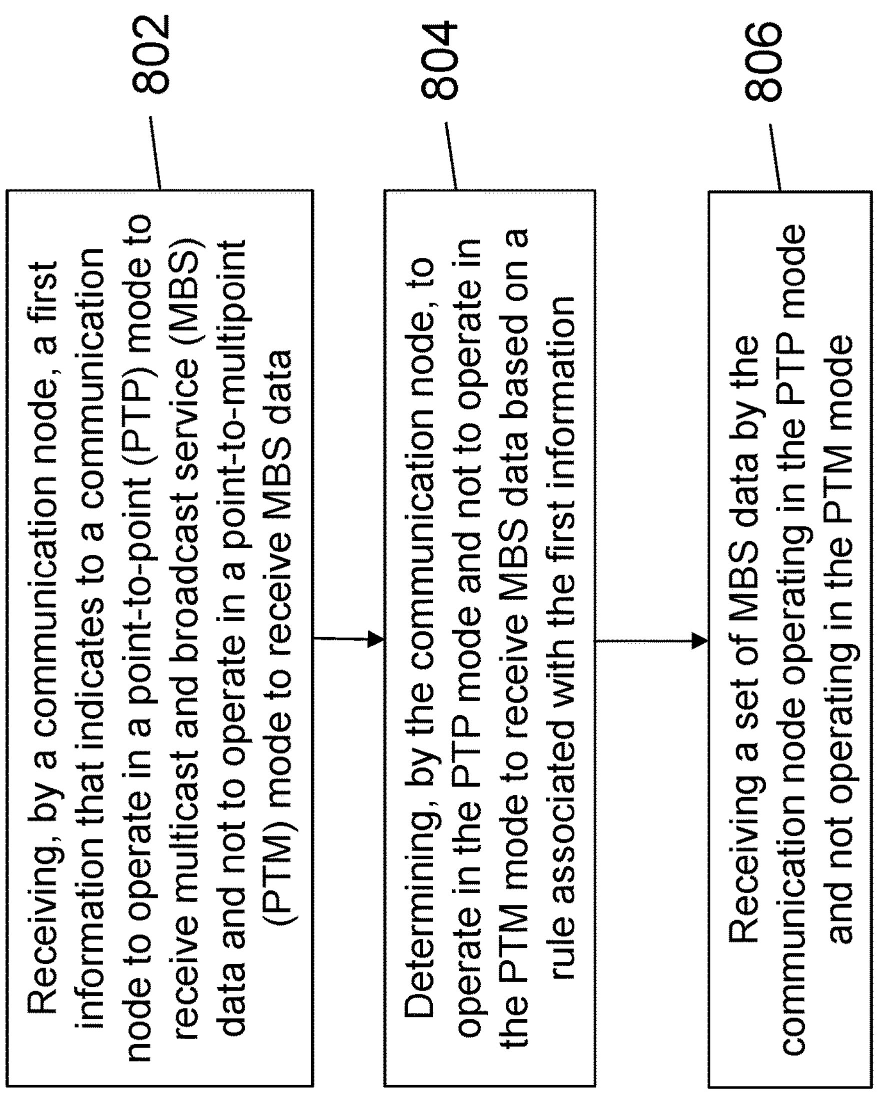
FIG. 8 shows an exemplary flowchart for operating a communication node in either a PTM mode or a PTP mode.

FIG. 8 shows an exemplary flowchart for operating a communication node (e.g., a communication device or user equipment) in either a PTM mode or a PTP mode. Operation 802 includes receiving, by a communication node, a first information that indicates to a communication node to operate in a point-to-point (PTP) mode to receive multicast and broadcast service (MBS) data and not to operate in a point-to-multipoint (PTM) mode to receive MBS data. Operation 804 includes determining, by the communication node, to operate in the PTP mode and not to operate in the PTM mode to receive MBS data based on a rule associated with the first information. Operation 806 includes receiving a set of MBS data by the communication node operating in the PTP mode and not operating in the PTM mode.

In some embodiments, the communication node receives the first information while operating in the PTM mode. In some embodiments, the rule specifies that the communication node determines to operate in the PTP mode and determines not to operate in the PTM mode in response to receiving the first information. In some embodiments, the rule specifies that the communication node determines to operate in the PTP mode and determines not to operate in the PTM mode after a length of time after receiving the first information.

Figure 9:
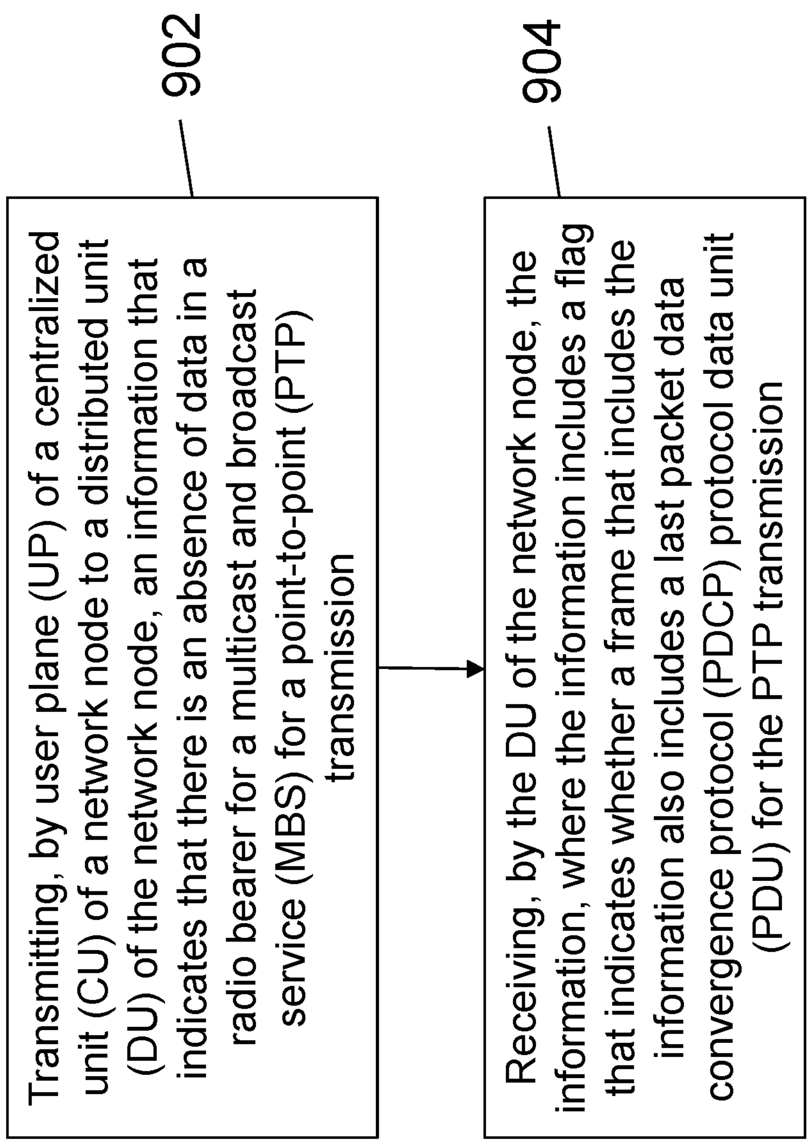
FIGS. 9 to 11 show three exemplary flowcharts for operating a network node in a split architecture.

FIG. 9 shows an exemplary flowchart for operating a network node in a split architecture. Operation 902 includes transmitting, by user plane (UP) of a centralized unit (CU) of a network node to a distributed unit (DU) of the network node, an information that indicates that there is an absence of data in a radio bearer for a multicast and broadcast service (MBS) for a point-to-point (PTP) transmission. Operation 904 includes receiving, by the DU of the network node, the information, where the information includes a flag that indicates whether a frame that includes the information also includes a last packet data convergence protocol (PDCP) protocol data unit (PDU) for the PTP transmission.

In some embodiments, the information includes a number of the one or more communication nodes and an identity of each communication node in response to the flag indicating that the frame includes the last PDCP PDU for the PTP transmission for the one or more communication nodes. In some embodiments, the frame is transmitted in a F1-U tunnel associated with the one or more communication nodes using a single radio bearer associated with the MBS. In some embodiments, the frame is transmitted in a F1-U tunnel associated with a specific communication node operating in the PTP mode. In some embodiments, the frame is transmitted in a F1-U tunnel delivering packets related to a single radio bearer associated with the MBS.

Figure 10:
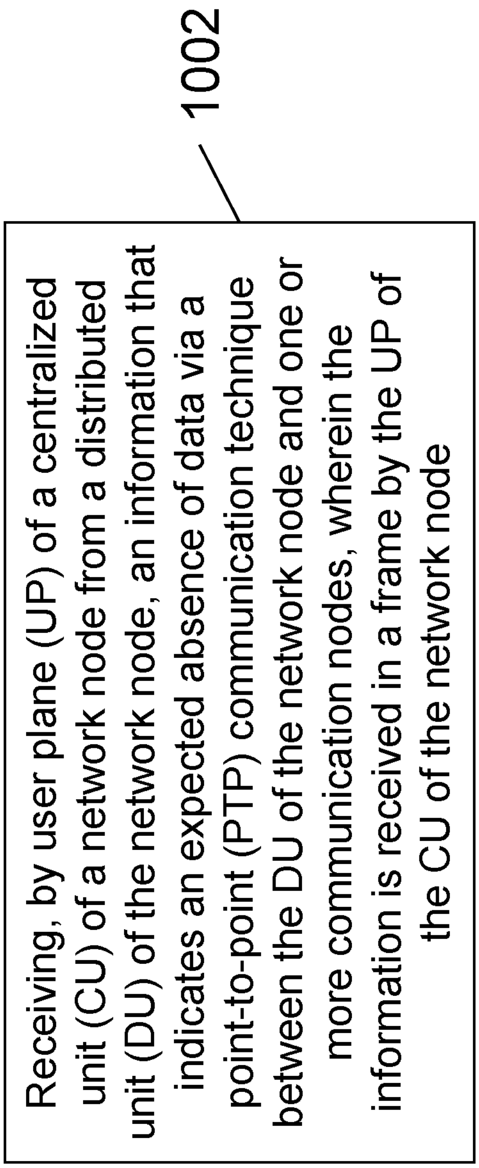

FIG. 10 shows another exemplary flowchart for operating a network node in a split architecture. Operation 1002 includes receiving, by user plane (UP) of a centralized unit (CU) of a network node from a distributed unit (DU) of the network node, an information that indicates an expected absence of data via a point-to-point (PTP) communication technique between the DU of the network node and one or more communication nodes, where the information is received in a frame by the UP of the CU of the network node.

In some embodiments, the frame further includes any one or more of a flag that indicates whether the information is for which of the one or more communication nodes, a number of the one or more communication nodes, and an identity of each communication node.

Figure 11:
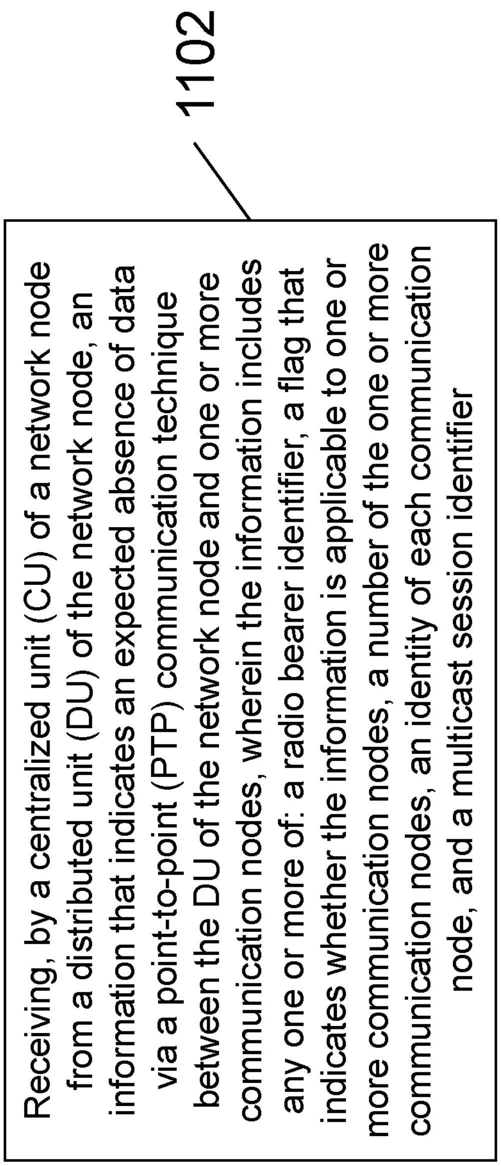

FIG. 11 shows yet another exemplary flowchart for operating a network node in a split architecture. Operation 1102 includes receiving, by a centralized unit (CU) of a network node from a distributed unit (DU) of the network node, an information that indicates an expected absence of data via a point-to-point (PTP) communication technique between the DU of the network node and one or more communication nodes, where the information includes any one or more of: a radio bearer identifier, a flag that indicates whether the information is applicable to one or more communication nodes, a number of the one or more communication nodes, an identity of each communication node, and a multicast session identifier.

In some embodiments, the information is received by a control plane (CP) of the CU. In some embodiments, the information is received by a user plane (UP) of the CU.

In some embodiments, an apparatus for wireless communication comprises a processor, configured to implement operations described in FIGS. 1-11 and in the various related embodiments. In some embodiments, a non-transitory computer readable program storage medium has code stored thereon, the code, when executed by a processor, causing the processor to implement operations described in FIGS. 1-11 and in the various related embodiments.

In this document the term “exemplary” is used to mean “an example of” and, unless otherwise stated, does not imply an ideal or a preferred embodiment. In this patent, terms such a first, second, third . . . ninth, etc., are not meant to indicate any particular order, unless specified otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

receiving, by a communication node while operating in a point-to-point (PTP) mode, a first information that indicates to the communication node to operate in a point-to-multipoint (PTM) mode to receive multicast and broadcast service (MBS) data, wherein the first information indicates to the communication node to operate in the PTM mode and not to operate in the PTP mode to receive MBS data;

receiving, by the communication node, a second information that indicates to the communication node to not operate in the PTP mode to receive MBS data, wherein the second information indicates an absence of data transmission to the communication node via the PTP mode; and receiving MBS data by operating the communication node in the PTM mode and not in the PTP mode in response to the first information and the second information.

2. The method of claim 1, wherein the second information is indicated by a flag included in a packet data convergence protocol (PDCP) protocol data unit (PDU) or a radio link control (RLC) PDU.

3. The method of claim 1, wherein the communication node transmits a packet data convergence protocol (PDCP) status report to a network node in response to receiving the first information, and wherein the PDCP status report indicates whether one or more packets are successfully received by the communication node.

4. The method of claim 1, wherein the second information is included in a radio resource control (RRC) signal, a packet data convergence protocol (PDCP) protocol data unit (PDU), a radio link control (RLC) PDU, or a medium access control-control element (MAC CE).

5. An apparatus for wireless communication comprising: at least one processor and a memory, configured to implement a method, the at least one processor configured to:

receive, by a communication node while operating in a point-to-point (PTP) mode, a first information that indicates to the communication node to operate in a point-to-multipoint (PTM) mode to receive multicast and broadcast service (MBS) data, wherein the first information indicates to the communication node to operate in the PTM mode and not to operate in the PTP mode to receive MBS data;

receive, by the communication node, a second information that indicates to the communication node to not operate in the PTP mode to receive MBS data, wherein the second information indicates an absence of data transmission to the communication node via the PTP mode; and receive MBS data by operating the communication node in the PTM mode and not in the PTP mode in response to the first information and the second information.

6. The apparatus of claim 5, wherein the second information is indicated by a flag included in a packet data convergence protocol (PDCP) protocol data unit (PDU) or a radio link control (RLC) PDU.

7. The apparatus of claim 5, wherein the communication node transmits a packet data convergence protocol (PDCP) status report to a network node in response to reception of the first information, and wherein the PDCP status report indicates whether one or more packets are successfully received by the communication node.

8. The apparatus of claim 5, wherein the second information is included in a radio resource control (RRC) signal, a packet data convergence protocol (PDCP) protocol data unit (PDU), a radio link control (RLC) PDU, or a medium access control-control element (MAC CE).

9. A non-transitory computer readable program storage medium having code stored thereon, the code, when executed by a processor, causing the processor to implement a method, comprising:

receiving, by a communication node while operating in a point-to-point (PTP) mode, a first information that indicates to the communication node to operate in a point-to-multipoint (PTM) mode to receive multicast and broadcast service (MBS) data, wherein the first information indicates to the communication node to operate in the PTM mode and not to operate in the PTP mode to receive MBS data;

receiving, by the communication node, a second information that indicates to the communication node to not operate in the PTP mode to receive MBS data, wherein the second information indicates an absence of data transmission to the communication node via the PTP mode; and receiving MBS data by operating the communication node in the PTM mode and not in the PTP mode in response to the first information and the second information.

10. The non-transitory computer readable program storage medium of claim 9, wherein the second information is indicated by a flag included in a packet data convergence protocol (PDCP) protocol data unit (PDU) or a radio link control (RLC) PDU.

11. The non-transitory computer readable program storage medium of claim 9, wherein the communication node transmits a packet data convergence protocol (PDCP) status report to a network node in response to receiving the first information, and wherein the PDCP status report indicates whether one or more packets are successfully received by the communication node.

* * * * *